Feb. 13, 1934.    J. K. LEIBING    1,947,269
MAGNETO-ELECTRIC MACHINE
Filed Dec. 29, 1932
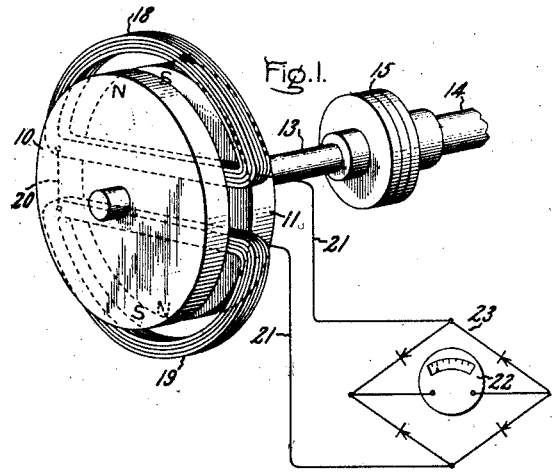
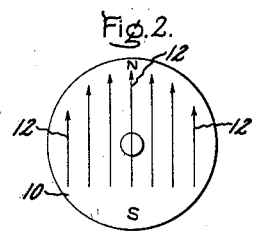
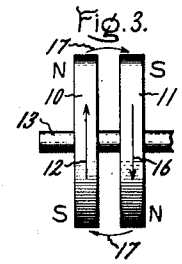
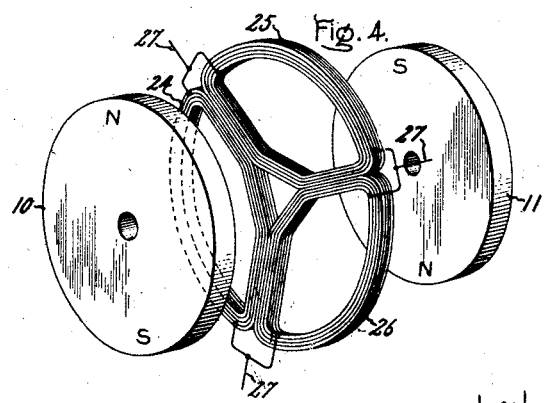
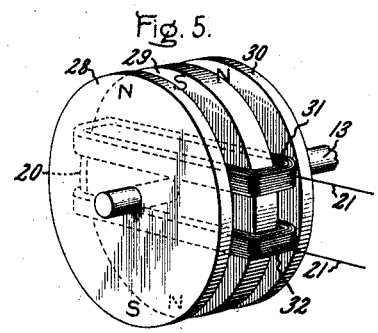
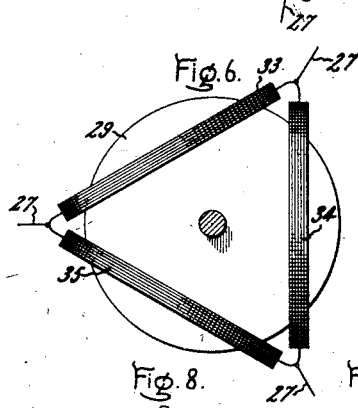
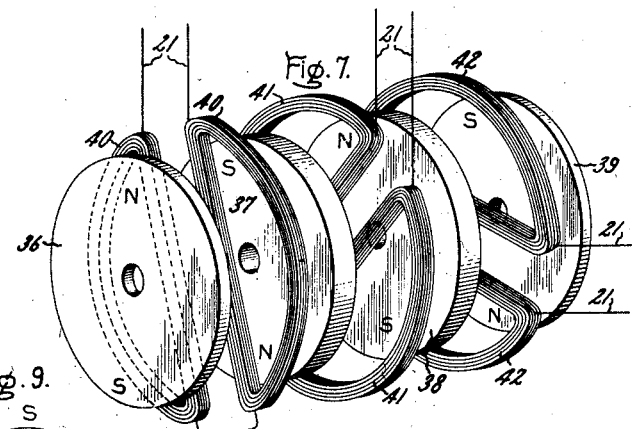
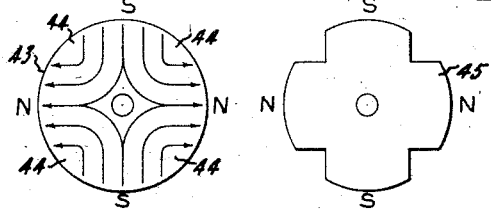
Inventor:
Joseph K. Leibing,
by Charles E. Tullar
His Attorney.

Patented Feb. 13, 1934

1,947,269

UNITED STATES PATENT OFFICE 1,947,269

MAGNETO-ELECTRIC MACHINE

Joseph K. Leibing, Scotia, N. Y., assignor to General Electric Company, a corporation of New York Application December 29, 1932
Serial No. 649,345

18 Claims. (Cl. 171—252)

My invention relates to magneto-electric machines. The principal object of my invention is to provide an improved machine of the class referred to which has a relatively rotatable permanent magnet field structure and armature winding so arranged that during their relative rotation the reluctance of the entire magnetic circuit remains substantially constant, which has no hysteresis or eddy current losses, which is entirely free from cyclic variations in the rotor torque due to pole pull, such as take place in the common type of magneto-electric machines, and which has other important advantages that will in part be obvious and in part specifically referred to in this specification.

At present, I believe that the most important practical application of my improved machine is its use as a tachometer generator. In explaining the operating principles of my machine, and the preferred constructions thereof, reference will, therefore, be made to its use as a tachometer generator. However, this is done for ilustrative purposes only, since my improved machine is not restricted to this specific use and may be operated as a synchronous motor as well as a generator. I therefore wish it clearly understood that wherever I employ the term "magneto-electric machine" in the appended claims, I mean either a generator or a motor employing permanent magnets to produce its magnetizing flux.

The usual magneto type tachometer generator has at least one rotating permanent magnet to supply its magnetic filed in order to avoid the disadvantage of requiring an outside source of power. So far as I am aware, all prior-art tachometer generators of this type employ an armature winding having a magnetic core, and have their rotating permanent magnet and armature core so arranged that the reluctance of the magnet circuit varies cyclically during each rotor revolution, and so that the armature core is threaded by an alternating magnetic flux of varying intensity. This arrangement not only causes hysteresis and eddy current losses in the generator, but is also the cause of the following more serious disadvantages:

1. The variations in the reluctance of the magnetic circuit causes cyclic variations in the magnitude of the magnetic flux passing through the magnet. This, together with the eddy currents in the armature core, subjects the permanent magnet to a demagnetizing force which tends to weaken it gradually from its initial strength, and therefore tends to cause erroneous speed indications by the indicating instrument energized by the generator, unless the instrument is often calibrated, especially during the early part of the generator's service period.

2. The variations in the reluctance of the magnetic circuit cause variations in the strength of the magnetic attraction between the permanent magnet pole pieces and the armature core during each electrical cycle, thus causing variations in the counter torque of the rotor. This in turn makes it extremely difficult, if not impossible, to use the generator for measuring the speed of a rotating body having a very small driving torque, since the maximum counter torque of the generator rotor may exceed the driving torque of the rotating body and thereby stall the latter, especially at very low speeds when the rotor momentum is very small.

On the other hand, the usual mechanical type of hand tachometer is subject to the following disadvantages:

1. It employs a changeable speed gearing mechanism in order to be capable of measuring a fairly wide speed range.

2. Because of this gearing mechanism the tachometer has at low speeds a much greater counter torque than at high speeds. This makes it extremely difficult, if not impossible, to use the tachometer for measuring low speeds of a rotating body having a very small driving torque, since the added load due to the tachometer counter torque may very appreciably reduce the speed of the rotating body.

There was consequently a long felt need in industry for a simple, rugged, light weight, and inexpensive tachometer which avoids the above mentioned disadvantages of the prior art mechanical type and electrical type tachometers. My invention makes possible this desired tachometer by providing a novel form of magneto-electric tachometer generator. Briefly described, my generator consists of a relatively rotatable permanent magnet field structure and armature winding so arranged that during their relative rotation the reluctance of the entire magnetic circuit remains substantially constant and so that there are no elements of magnetic material threaded by an alternating or varying intensity magnetic flux.

My invention, however, will be best understood from the following description when considered in connection with the accompany drawing, while those features of my invention which are believed to be novel and patentable are pointed out in the appended claims.

Fig. 1 of the drawing is a perspective view of a preferred form of my generator employing two permanent disc magnets and a single phase armature winding. Fig. 2 is a view, in front elevation, of one of the disc magnets shown in Fig. 1. Fig. 3 is a view, in side elevation of the two disc magnets shown in Fig. 1. Fig. 4 is an exploded perspective view of a preferred form of my generator employing two permanent disc magnets and a three-phase armature winding. Fig. 5 is a perspective view of a preferred form of my generator employing three permanent disc magnets and a single-phase armature winding. Fig. 6 illustrates how to arrange a three-phase armature winding for the generator shown in Fig. 5. Fig. 7 is an exploded perspective view of a preferred form of my generator employing four permanent disc magnets and a three-phase armature winding. Figs. 8 and 9 represent views, in front elevation, of a four-pole disc magnet. Similar parts in the different figures are represented by the same reference numerals.

In Fig. 1, I illustrate a generator having a magnetic field structure consisting of two permanent disc magnets 10 and 11. Each magnet is magnetized along a diameter to have two magnetic poles of opposite polarities at its periphery, these poles being diametrically opposite each other and being represented by N and S, respectively. A front elevation view of one of the magnets, e. g., magnet 10, is shown in Fig. 2, in which 12 represents the substantially parallel magnetic flux lines passing through the magnet. I prefer to make magnets 10 and 11 of disc form, because in a disc form magnet each element of the disc contributes more or less equally to the total retained flux and there is a minimum demagnetizing tendency in the magnet, and because a generator employing a disc form magnet delivers an alternating voltage of practically sine wave shape. I also prefer to make magnets 10 and 11 out of cobalt steel, because this material has a very high coercive force, i. e., it possesses a high degree of magnetic retentivity, which in turn permits the use of comparatively thick discs having efficient flux densities with sufficient total magnetic flux for the purposes desired. Magnets 10 and 11 in Fig. 1 are preferably made the rotatable member of the generator. These magnets are secured to a rotatable shaft 13 so that their adjacent faces are separated by an air gap and are parallel to each other, the shaft being supported in suitable bearings (not shown). Shaft 13 is driven by the apparatus the speed of which it is desired to measure, the driving shaft of this apparatus being represented by 14. Shafts 13 and 14 are secured to opposite sides of a coupling 15 which transmits the driving torque of shaft 14 to shaft 13. Magnets 10 and 11 are preferably so secured to shaft 13 that the center of the N pole of magnet 10 and the center of the S pole of magnet 11 face each other directly across a minimum length of the air gap between them, and the same is true of the N pole of magnet 11 and the S pole of magnet 10. This arrangement of the magnets gives the maximum possible magnetic flux, because the magnetomotive forces of the two magnets assist each other, and because each magnet acts as a return path for the magnetic flux of the other magnet, the magnetic flux going from one magnet to the other across the air gap therebetween. The flux paths of the two magnets are represented in Fig. 3, in which 12 and 16 represent the directions of the magnetic flux lines passing through magnets 10 and 11, respectively, and 17 represents the magnetic flux lines passing from one magnet to the other across the air gap therebetween. The generator shown in Fig. 1 has an armature winding consisting of two similar pancake coils 18 and 19 of approximately semi-circular shape. These coils are stationary and are supported by suitable means (not shown) in the air gap between the magnets so that they are threaded by the magnetic flux passing across the air gap and so that the centers of their circular sides are separated 180 degrees. The cores of coils 18 and 19 may be of any non-magnetic material, but for the sake of simplicity I have shown them having air cores. The coils are preferably so formed and so positioned that the circular portions of the coils protrude slightly beyond the peripheries of the magnets, and the straight portions of the coils are parallel to each other and near shaft 13. This arrangement of the coils causes them to be threaded by the maximum possible magnetic flux from the magnets when the centers of the poles of the magnets are in line with the centers of the circular portions of the coils, and also results in the coils being threaded by substantially equal amounts of flux at any instant. The two coils are connected in series by a lead 20, so that at any instant the voltages induced in the coils aid each other. The terminals of the armature winding are represented by leads 21.

It is clear that rotation of shaft 13 causes an alternating magnetic flux of varying intensity to thread coils 18 and 19, thus inducing an alternating voltage in each coil. The two voltages are displaced 180 electrical time degrees, but by properly connecting the coils in series by lead 20, these voltages aid each other, so that the voltage between leads 21 is practically the algebraic sum of the two coil voltages. Obviously, coils 18 and 19 may be connected in parallel, if desired. The voltage between leads 21 may be impressed on any suitable electrically operated indicating instrument that is properly calibrated in speed units so as to indicate the speed of the apparatus that drives shaft 13. Thus, for example, leads 21 may be connected to a d—c. milli-voltmeter 22, a suitable full wave rectifier 23 being interposed to convert the alternating current into direct current. Milli-voltmeter 22 will be suitably calibrated so that its pointer will indicate the speed of the apparatus that drives shaft 13.

It is clear that there is no variation in the reluctance of the magnetic circuit of magnets 10 and 11 as they are rotated, hence there is no variation in the magnitude of the magnetic flux passing through the magnets as they are rotated. Also, there are no hysteresis or eddy current losses, because there are no magnetic elements threaded by an alternating or varying intensity magnetic flux. The absence of cyclic variations in the magnitude of the magnetic flux threading the magnets, together with the absence of eddy currents, practically eliminates all causes originating within the machine that tend to demagnetize the permanent magnets. In cases where the generator shown in Fig. 1 (or the generator shown in any of the other figures of my drawing) may be subjected to external stray magnetic fields of harmful magnitudes, it should be provided with a magnetic shield. I have not illustrated such a magnetic shield in my drawing, because it is not essential to the operation of my generator, and because the proper arrangement of such a shield is well known to those skilled in the art to which my invention pertains. It should now be clear that my generator not only possesses the advantage of not having hysteresis and eddy current losses, but, in addition, there is less tendency for the speed indicating instrument energized by my generator to give erroneous indications due to gradual demagnetization of the generator permanent magnets than is the case when the above-mentioned prior-art tachometer generators are employed. Also, the absence of a variation in the reluctance of the magnetic circuit of my generator during each electrical cycle eliminates all pole pull, hence, disregarding friction and windage effects, the torque required to drive the generator is only that needed to overcome the mechanical reaction between the current in the armature winding and the magnetic field. This mechanical reaction is small with the usual tachometer generator load current; and and it is practically constant during a complete electrical cycle in the three-phase generators described later. It is therefore obvious that my generator can be used for measuring the speed of any rotating apparatus capable of exerting the small torque necessary to rotate shaft 13, and the load due to my generator will not appreciably reduce the speed of the rotating apparatus. This was not always possible with the above-mentioned prior-art tachometer generators, for reasons previously explained. Furthermore, with the magnets in my generator arranged as shown, the air gap therebetween remains constant with equal or unequal wear of shaft 13, or of the shaft bearings, or of both, hence the magnitude of the magnetic flux passing across the air gap remains constant during such wear. This fact, together with the previously described arrangement of the armature winding, causes the effective value of the generator voltage to remain constant, as its shaft, bearings or both wear during operation, until the end of their useful lives is reached and they must be replaced. This makes it unnecessary to recalibrate the speed indicating instrument energized by the generator in order to prevent erroneous indications due to the above-mentioned wear, as is the case with the previously described prior-art tachometer generators. In addition to the above-mentioned operating advantages, my generator has important constructional advantages, as for example the absence of laminations in the field structure and armature core, and the use of solid disc magnets. These features make possible a simple, rugged and inexpensive generator.

I have illustrated both discs 10 and 11 as permanent magnets because this gives the maximum magnetic flux in the generator. This however is preferable, but not essential, since it is obvious that the generator will operate satisfactorily if one of the discs is a permanent magnet and the other disc is of magnetic material. If only one of the discs is a permanent magnet, it will be essential to have at least this disc rotatable, if a rotatable magnet field structure is employed, although it usually will be desirable to have both discs rotate in such a case.

The generator shown in Fig. 4 is similar to that shown in Fig. 1, except that it has three armature coils 24, 25, and 26 so arranged in the air gap between disc magnets 10 and 11 that their induced voltages are displaced 120 electrical time degrees. These coils are shown connected in three-phase delta, but they may be connected in any other desired manner. The terminals of the armature winding are represented by leads 27. In order to give a clear view of the generator shown in Fig. 4, the shaft secured to the magnets has been omitted and the magnets have been shown separated by a much larger air gap than that shown in Fig. 1. Actually, however, a shaft will be secured to the magnets and the latter will be spaced apart as shown in Fig. 1.

In Fig. 5, I illustrate a generator having a magnetic field structure consisting of three permanent magnets 28, 29, and 30 secured to shaft 13 so that they are parallel to each other with an air gap between every two adjacent magnets. Each magnet is magnetized along its diameter to have two magnetic poles, as shown in Fig. 2, and each of magnets 28 and 30 is approximately one-half as thick as magnet 29. These magnets are preferably so secured to the shaft that magnet 29 is substantially midway between the other two magnets, and so that every two adjacent magnets have the centers of magnetic poles of opposite polarites facing each other directly across a minimum length of the air gap between them. This arrangement of the magnets gives the maximum possible magnetic flux because the magnetomotive forces of every two adjacent magnets aid each other. Each of magnets 28 and 30 acts as a return path for approximately one-half of the magnetic flux of magnet 29, whereas the latter acts as a return path for the magnetic flux of magnets 28 and 30. The stationary armature winding consists of two similar coils 31 and 32 surrounding magnet 29 in the manner shown, these coils being supported by suitable means (not shown). It is clear that rotation of the magnets will cause coils 31 and 32 to be threaded by an alternating magnetic flux of varying intensity, hence inducing an alternating voltage in each coil. By properly connecting the two coils in series by lead 20, the voltage between terminal leads 21 will be substantially the algebraic sum of the two coil voltages. It is clear that the operating principles of the generator shown in Fig. 5 are the same as those of the generator shown in Fig. 1, and therefore the former will have all the constructional and operating advantages of the latter. Furthermore, if the width of the air gap between every two adjacent magnets in the generator shown in Fig. 5 is the same as that between the magnets in the generator shown in Fig. 1, then the reluctance of the magnetic circuit in Fig. 5 will be approximately one-half of that in Fig. 1. From this it follows that if the magnetomotive forces of the magnets in Fig. 5 are the same as those of the magnets in Fig. 1, and if the armature coils in the two generators have the same number of turns, then the generator shown in Fig. 5 will have the additional advantage that it will deliver approximately twice the voltage delivered by the generator shown in Fig. 1.

Fig. 6 shows how to dispose three coils surrounding magnet 29 of the generator shown in Fig. 5 so that their induced voltages will be displaced 120 electrical time degrees. These coils are represented by 33, 34, and 35, and are shown connected in three-phase delta.

In Fig. 5, I have illustrated all three discs as permanent magnets, because this gives the maximum flux in the generator. This however is preferable, but not essential, since it is obvious that the generator will operate satisfactorily if disc 29 is a permanent magnet and discs 28 and 30 are of magnetic material, and vice versa. In either of these cases it will be essential to have at least the disc or discs which are permanent magnets rotatable, if a rotatable magnet field structure is employed, although it usually will be desirable to have all the discs rotatable in such a case.

From the arrangements of the armature winding shown in Figs. 5 and 6, it should be clear that the single-phase armature winding of the generator shown in Fig. 1 may consist of two coils surrounding magnet 10 or 11 in the manner shown in Fig. 5, and the three-phase armature winding of the generator shown in Fig. 4 may consist of three coils surrounding magnet 10 or 11 in the manner shown in Fig. 6.

In Fig. 7, I illustrate a generator having a magnetic field structure consisting of four permanent magnets 36, 37, 38, and 39, each of which is magnetized along its diameter to have two magnetic poles, as shown in Fig. 2. Each of magnets 36 and 39 is approximately one-half as thick as each of magnets 37 and 38. In order to give a clear view of the generator shown in Fig. 7, I have omitted the shaft to which the magnets are secured and have shown the latter separated by much larger air gaps than shown in Figs. 1 and 5. Actually, however, a shaft will be secured to the magnets and the latter will be spaced apart as shown in Figs. 1 and 5. The magnets shown in Fig. 7 are preferably so secured to the shaft that every two adjacent magnets have the centers of magnetic poles of opposite polarities facing each other directly across a minimum length of the air gap between them. This arrangement of the magnets gives the maximum possible magnetic flux, because the magnetomotive forces of every two adjacent magnets aid each other. Each of the magnets 36 and 38 acts as a return path for approximately one-half of the magnetic flux of magnet 37, and each of magnets 37 and 39 acts as a return path for approximately one-half of the magnetic flux of magnet 38, whereas magnets 37 and 38 act as return paths for the magnetic flux of magnets 36 and 39, respectively. With this arrangement, substantially equal values of magnetic flux pass across the air gap between every two adjacent magnets. Two similar coils 40 are located in the air gap between magnets 36 and 37, two similar coils 41 are located in the air gap between magnets 37 and 38, and two similar coils 42 are located in the air gap between magnets 38 and 39. These coils are held in stationary positions by suitable means (not shown). It is obvious that rotation of the magnets will cause substantially equal alternating voltages to be induced in each coil. The two coils of each pair are so connected in series that the terminal voltage of the pair is practically equal to the algebraic sum of the two coil voltages, and the three pairs of coils are so arranged that their terminal voltages will be displaced 120 electrical time degrees. The three pairs of coils may be connected in any desired manner to deliver three-phase current. It is clear that the operating principles of the generator shown in Fig. 7 are the same as those of the generators shown in Figs. 1 and 5, and therefore the former will have all the constructional and operating advantages of the latter.

I have illustrated all four discs as permanent magnets, because this gives the maximum magnetic flux for the generator. This however is preferable, but not essential, since it is obvious that the generator will operate satisfactorily if only discs 36 and 38, or only discs 37 and 39, or only discs 37 and 38, are permanent magnets and the other two discs are of magnetic material. In either of these cases it will be essential to have rotatable at least those discs which are permanent magnets, if a rotatable magnet field structure is employed, although it usually will be desirable to have all the discs rotatable in such a case.

In some cases it may be desirable to employ in my generator a disc or discs having more than two magnetic poles in order to increase the frequency of the generator voltage for a given rotor speed above that obtainable with two pole magnets. Fig. 8 shows how a disc magnet can be magnetized so as to have four magnetic poles at its periphery, this magnet being represented by 43. Disc magnet 43 has neutral sections 44, each of which tends to act as a magnetic shunt or armature between two magnetic poles, thus tending to reduce the magnitude of the magnetic flux leaving the magnet. It may therefore be desirable in some cases to remove these neutral sections from the magnet. A magnet with these neutral sections removed is represented by 45 in Fig. 9.

In accordance with the provisions of the Patent Statutes, I have described the principles of operation of my invention, together with the apparatus which I now consider to represent the best embodiments thereof, but I desire to have it understood that the apparatus shown and described is only illustrative and that the invention may be carried out by other means.

What I claim as new and desire to secure by Letters Patent of the United States is:

1. A magneto-electric machine comprising a magnetic field structure consisting of at least one permanent disc magnet magnetized along its diameter to have at least two arc-shaped magnetic poles of opposite polarities around its periphery and at least one adjacent magnetic element separated from said magnet by an air gap and arranged to form a return path for the magnetic flux of the magnet, and an armature winding in said air gap, said field structure and armature winding being relatively rotatable and being so arranged that during their relative rotation the reluctance of the entire magnetic circuit remains substantally constant and the armature winding is threaded by a magnetic flux of varying intensity from said permanent magnet.

2. A magneto-electric machine comprising a rotatable permanent disc magnet magnetized along its diameter to have at least two arc-shaped magnetic poles of opposite polarities around its periphery, a rotatable magnetic element separated from said magnet by an air gap and arranged to form a return path for the magnetic flux of the magnet, and a stationary armature winding in said air gap so arranged that rotation of said permanent magnet and magnetic element causes it to be threaded by a magnetic flux of varying intensity from the permanent magnet.

3. A magneto-electric machine comprising a magnetic field structure consisting of two adjacent permanent disc magnets each magnetized along its diameter to have at least two arc-shaped magnetic poles of opposite polarities around its periphery, said magnets being separated by an air gap and being so arranged that each magnet serves as a return path for the magnetic flux passing through the other magnet, and an armature winding in said air gap, said field structure and armature winding being relatively rotatable and being so arranged that during their relative rotation the reluctance of the entire magnetic circuit remains substantially constant and the armature winding is threaded by a magnetic flux of varying intensity from said magnets.

4. A magneto-electric machine comprising two adjacent rotatable permanent disc magnets each magnetized along its diameter to have at least two arc-shaped magnetic poles of opposite polarities around its periphery, said magnets being separated by an air gap and being so arranged that each magnet serves as a return path for the magnetic flux passing through the other magnet, and a stationary armature winding in said air gap so arranged that rotation of said magnets causes it to be threaded by a magnetic flux of varying intensity from said permanent magnets.

5. A magneto-electric machine comprising a magnetic field structure consisting of at least one permanent disc magnet magnetized along its diameter to have at least two arc-shaped magnetic poles of opposite polarities around its periphery and at least one adjacent magnetic element separated from said magnet by an air gap and arranged to form a return path for the magnetic flux of the magnet, and an armature winding in said air gap, said permanent magnet and armature winding being relatively rotatable and being so arranged that during their relative rotation the reluctance of the entire magnetic circuit remains substantially constant and the armature winding is threaded by a magnetic flux of varying intensity from the permanent magnet.

6. A magneto-electric machine comprising two adjacent rotatable permanent disc magnets each magnetized along its diameter to have two magnetic poles of opposite polarities around its periphery, said magnets being separated by an air gap and being so arranged that the centers of magnetic poles of opposite polarities face each other directly across a minimum length of said air gap, and a stationary armature winding in said air gap so arranged that rotation of said magnets causes it to be threaded by a magnetic flux of varying intensity from the magnets.

7. A magneto-electric machine comprising a magnetic field structure consisting of a permanent disc magnet magnetized along its diameter to have at least two arc-shaped magnetic poles of opposite polarities around its periphery and two adjacent magnetic elements respectively disposed on opposite sides of said magnet, each of said magnetic elements being separated from said magnet by an air gap and each being arranged to form a return path for a portion of the magnetic flux passing through the magnet, and an armature winding in the air gaps between said magnet and its adjacent magnetic elements, said field structure and armature winding being relatively rotatable and being so arranged that their relative rotation causes the armature winding to be threaded by a magnetic flux of varying intensity from said magnet.

8. A magneto-electric machine comprising a magnetic field structure consisting of two permanent disc magnets each magnetized along its diameter to have at least two arc-shaped magnetic poles of opposite polarities around its periphery and a magnetic element between said permanent magnets, said permanent magnets and magnetic element being separated by air gaps and being so arranged that the magnetic element forms a return path for the magnetic flux passing through each magnet, and an armature winding in said air gaps, said field structure and armature winding being relatively rotatable and being so arranged that their relative rotation causes the armature winding to be threaded by a magnetic flux of varying intensity from said magnets.

9. A magneto-electric machine comprising a magnetic field structure consisting of at least three adjacent permanent disc magnets each magnetized along its diameter to have at least two arc-shaped magnetic poles of opposite polarities around its periphery, said magnets being separated by air gaps and being so arranged that every two adjacent magnets have the centers of magnetic poles of opposite polarities facing each other directly across a minimum length of an air gap, and an armature winding in said air gaps, said field structure and armature winding being relatively rotatable and being so arranged that their relative rotation causes the armature winding to be threaded by a magnetic flux of varying intensity from said magnets.

10. A magneto-electric machine comprising a rotatable permanent disc magnet magnetized along its diameter to have at least two arc-shaped magnetic poles of opposite polarities around its periphery, two adjacent rotatable magnetic elements respectively disposed on opposite sides of said magnet, each of said magnetic elements being separated from said magnet by an air gap and each being arranged to form a return path for a portion of the magnetic flux passing through the magnet, and a stationary armature winding in the air gaps between said magnet and its adjacent magnetic elements, said armature winding being so arranged that rotation of said magnet and its adjacent magnetic elements causes it to be threaded by a magnetic flux of varying intensity from the magnet.

11. A magneto-electric machine comprising two spaced apart rotatable permanent disc magnets each magnetized along its diameter to have at least two arc-shaped magnetic poles of opposite polarities around its periphery, a rotatable magnetic element between said magnets, said parmanent magnets and magnetic element being separated by air gaps and being so arranged that the magnetic element forms a return path for the magnetic flux passing through each magnet, and a stationary armature winding in said air gaps so arranged that rotation of said permanent magnets and magnetic element causes it to be threaded by a magnetic flux of varying intensity from the magnets.

12. A magneto-electric machine comprising a magnetic field structure consisting of at least one disc-shaped permanent magnet magnetized along its diameter to have at least two arc-shaped magnetic poles of opposite polarities around its periphery and two disc-shaped magnetic elements respectively disposed on opposite sides of said magnet with each magnetic element being substantially one-half as thick as said magnet, each of said magnetic elements being separated from said magnet by an air gap and each being arranged to form a return path for substantially one-half of the magnetic flux passing through the magnet, and an armature winding in the air gaps between said magnet and magnetic elements, said field structure and armature winding being relatively rotatable and being so arranged that their relative rotation causes the armature winding to be threaded by a magnetic flux of varying intensity from said magnet.

13. A magneto-electric machine comprising a magnetic field structure consisting of at least two disc-shaped permanent magnets having substantially the same thickness, with each magnet magnetized along its diameter to have at least two magnetic poles of opposite polarities around its periphery, and a disc-shaped magnetic element between said magnets of substantially twice the thickness of each magnet, said magnets and magnetic element being separated by air gaps and being so arranged that the magnetic element forms a return path for the magnetic flux passing through each magnet, and an armature winding in said air gaps, said field structure and armature winding being relatively rotatable and being so arranged that their relative rotation causes the armature winding to be threaded by a magnetic flux of varying intensity from the magnets.

14. A magneto-electric machine comprising three adjacent rotatable permanent disc magnets each magnetized along its diameter to have at least two magnetic poles of opposite polarities around its periphery, with each of the two outside magnets being substantially one-half as thick as the middle magnet, said magnets being separated by air gaps and being so arranged that every two adjacent magnets have the centers of magnetic poles of opposite polarities facing each other directly across a minimum length of an air gap, and a stationary armature winding in said air gaps so arranged that rotation of said magnets causes it to be threaded by a magnetic flux of varying intensity from the magnets.

15. A magneto-electric machine comprising three adjacent rotatable permanent disc magnets each magnetized along its diameter to have two magnetic poles of opposite polarities around its periphery, said magnets being separated by air gaps and being so arranged that every two adjacent magnets have the centers of magnetic poles of opposite polarities facing each other directly across a minimum length of an air gap, and a stationary armature winding in said air gaps so arranged that rotation of said magnets causes it to be threaded by a magnetic flux of varying intensity from the magnets.

16. A magneto-electric machine comprising two adjacent rotatable permanent disc magnets having substantially the same thickness, with each magnet magnetized along its diameter to have at least two magnetic poles of opposite polarities around its periphery, said magnets being separated by an air gap and being so arranged that the centers of magnetic poles of opposite polarities face each other directly across a minimum length of said air gap, a rotatable magnetic disc element separated by an air gap from one of said magnets and arranged to form a return path for a portion of its magnetic flux, a second rotatable disc element separated by an air gap from the other of said magnets and arranged to form a return path for a portion of its magnetic flux, each magnetic element being substantially one-half as thick as each magnet, and a stationary armature winding in said air gaps so arranged that rotation of said magnets and magnetic elements causes it to be threaded by a magnetic flux of varying intensity from the magnets.

17. A magneto-electric machine comprising four adjacent rotatable magnetic discs separated by air gaps, each of the two outside discs being substantially one-half as thick as each of the two inside discs, one of the outside thin discs and the second spaced therefrom thick disc being permanently magnetized along their diameters so that each has at least two magnetic poles of opposite polarities around its periphery, the other outside thin disc being arranged to form a return path for a portion of the magnetic flux of its adjacent thick magnetized disc, said magnetized discs being so arranged that magnetic flux from each one passes through the thick disc separating them, and a stationary armature winding in said air gaps so arranged that rotation of said discs causes it to be threaded by a magnetic flux of varying intensity from the magnets.

18. A magneto-electric machine comprising four adjacent rotatable permanent disc magnets each magnetized along its diameter to have two magnetic poles of opposite polarities around its periphery, said magnets being separated by air gaps and being so arranged that every two adjacent magnets have the centers of magnetic poles of opposite polarities facing each other directly across a minimum length of an air gap, and a stationary armature winding in said air gaps having a non-magnetic core, said armature winding being so arranged that the rotation of said magnets causes it to be threaded by a magnetic flux of varying intensity from the magnets.

JOSEPH K. LEIBING.